United States Patent [19]

Toncelli

[11] Patent Number: 4,981,539

[45] Date of Patent: Jan. 1, 1991

[54] PROCESS FOR THE STRUCTURAL REINFORCEMENT OF FRAGILE ARTICLES MADE OF STONE OR AGGLOMERATES

[76] Inventor: Luca Toncelli, Via Giovanni XXIII,2, Bassano del Grappa (Vicenza), Italy

[21] Appl. No.: 300,335

[22] Filed: Jan. 19, 1989

[30] Foreign Application Priority Data

Jan. 21, 1988 [IT] Italy ................................. 8509 A/88

[51] Int. Cl.$^5$ ............................................. B32B 35/00
[52] U.S. Cl. ..................................... 156/94; 52/309.13; 52/315; 156/61; 156/254; 156/73.6; 427/202; 427/359; 427/370; 428/15
[58] Field of Search ................. 52/309.13, 309.14, 315, 52/326, DIG. 7; 156/61, 94, 254, 73.6; 427/202, 359, 369, 370; 428/15

[56] References Cited

U.S. PATENT DOCUMENTS

| | | | |
|---|---|---|---|
| 1,534,353 | 4/1925 | Besser | 52/315 |
| 2,701,774 | 2/1955 | Marsell et al. | 427/202 |
| 3,097,080 | 7/1963 | Weir | 428/15 X |
| 3,161,556 | 12/1964 | Slosberg | 156/254 X |
| 3,878,030 | 4/1975 | Cook | 428/15 X |
| 4,698,010 | 10/1987 | Toncelli | 156/61 X |
| 4,822,661 | 4/1989 | Battaglia | 428/15 X |

*Primary Examiner*—Robert A. Dawson
*Attorney, Agent, or Firm*—Bucknam and Archer

[57] ABSTRACT

The process provides for the structural reinforcement of manufactured articles made of stone or, in general, agglomerates by means of a sequence of steps which comprise the following: (a) the article to be treated is heated; (b) spraying on one surface of the article a particular adhesive called primer; (c) spraying on the same surface a resin preferably containing glass fibers or fibers of another material; (d) spraying on the same surface grit of stone having a constant and defined granulometry; (e) applying an action of vibration or compression on the article in order to facilitate the cohesion of the grit with the resin; (f) letting the resin undergo a catalytic reaction which eventually may require application of heat; (g) levelling the surface by mechanical operations. The same process may be repeated on the other surface of the article if one desires to cut the article along its thickness for the purpose of obtaining a very thin product. The process is also aplicable to agglomerated articles for the purpose of obtaining very thin products and of limited weight while the mechanical and aesthetic properites remain unaltered. The product obtained by the process of the application offers structural properties substantially superior to the properties of the starting articles and permits to utilize material which is structurally weak and defective.

5 Claims, 1 Drawing Sheet

PROCESS FOR THE STRUCTURAL REINFORCEMENT OF FRAGILE ARTICLES MADE OF STONE OR AGGLOMERATES

The present invention relates to a process for the structural reinforcement of manufactured articles made of stone which is fragile in nature and defective as well as to the products which are obtained by the process of the present invention.

According to the state of the art, natural stone which does not have intrinsic structural properties due to internal defects such as flaws, fissures, the presence of inclusion of earth or other defects is considered reject of the quarry and, as such, cannot be used. This reject of quarry exists in any quarry although it varies. The variation may be from a minimum of 5% to values up to 100%.

Consequently, if the amount of the reject exceeds predetermined values, the quarry is not economically exploitable. In any case, the reject affects the cost of the manufactured article which is extracted from the quarry, worked and then sold.

An object of the present invention is to provide a simple and economical process which permits to recover totally or partially the blocks of defective material by imparting to the final product an adequate structural resistance so that the product may be used for covering floors or for coatings also of small thickness.

Another object of the invention is to increase the output of the quarry by lowering the cost of the product being extracted, in addition to providing the possibility of rendering economical even the exploitation of quarries in which the reject is high.

Still another object of the present invention is to reinforce agglomerated material, a fact which permits to obtain a product which is very thin and which is of limited weight while maintaining unaltered the mechanical and aesthetic properties so that it may be used for flooring or coatings.

The process described hereinbelow comprises the following operative stages:

heating the material to be treated for the purpose of eliminating every trace of moisture which could prevent the catalytic reaction of the resin being later applied;

treatment of the surface of the material to be treated with a particular adhesive called "primer" for the purpose of favoring the adhesion of the resin on the manufactured article;

distribution on one surface of the manufactured article of a resin containing glass fibers or other material for the purpose of reinforcing the same article;

strewing grit of stone of constant and defined granulometry on the surface already treated;

letting the grit penetrate in the underlying layer of resin by vibration or compression;

levelling the treated surface by mechanical operations;

finishing the surface which has not been treated for the purpose of obtaining a product of good aesthetic properties.

The invention is described hereinbelow in more detail by reference to the drawings of which:

According to the process of the present invention, the manufactured article 2 is heated and then treated with a primer which is a substance capable of ensuring the adhesion of the resin on the surface being treated. The resin 3 which contains glass fibers or fibers of another type is distributed on one of the two main surfaces of the article in a uniform manner. The distribution may be carried out with a sprayer of the type conventionally used or other systems.

Figure 1:
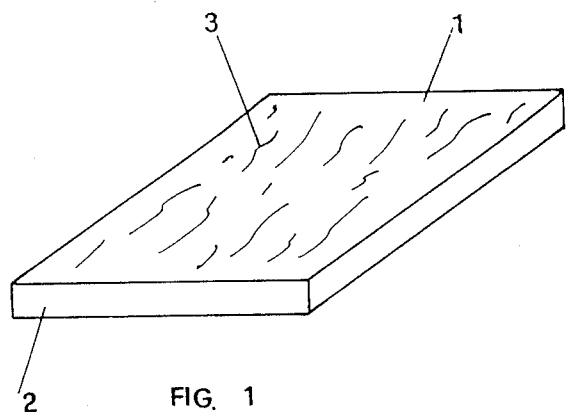
FIG. 1 shows the stage in which the resin with glass fibers or other material is sprayed on the surface of the manufactured article to be treated.
Figure 2:
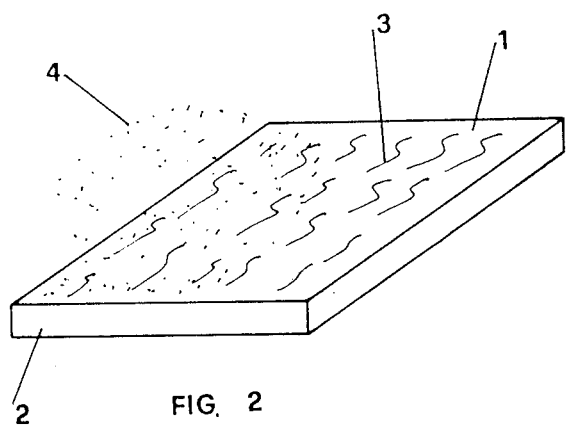
FIG. 2 shows the stage in which the stone grit is strewn.

After the resin has been distributed on the surface 1 of the article 2, the same surface 1 is strewn uniformily with stone grit 4 of a constant and defined granulometry as shown in FIG. 2.

Figure 3:
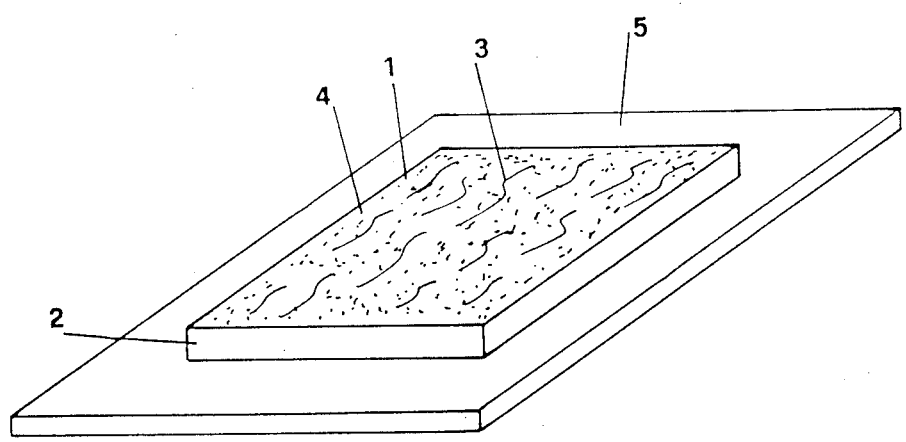
FIG. 3 shows the stage of compaction of the grit on the surface on which the resin has been sprayed.

After this operation has been completed, the article is placed on a vibrating plane 5 as shown in FIG. 3 or is subjected to mechanical pressure to permit and facilitate the cohesion between the resin and the grit.

The article 2 thus obtained is then allowed to undergo a catalytic reaction and, in order to accelerate this operation, may be heated again.

After the catalytic reaction has occured, surface 1 thus treated is subjected to a mechanical operation of gauging, for the purpose of rendering it perfectly planar. On the other hand, the surface not treated is subject to the conventional operations of smoothing, polishing and chamfering for the purpose of obtaining a product of high aesthetic appearance.

The product thus obtained offers a structural resistance superior to a product made only of one piece. The acquired structural resistance is due to the resin which contains glass fibers or fibers of another type such as, e.g. steel wire or wires of another metal.

The strewing of the grit serves the purpose mainly of imparting an irregular and porous surface which favors the adhesion of the surface on the laying plane.

The manufactured article prepared according to the process of this application may have a variety of shapes and dimensions depending upon the different requirements. The process of the invention is particularly suitable for the production of thin articles. In this case, the process if applied on both surfaces of the article, provided the article has a thickness sufficient to be handled. The article which is being reinforced in this manner may then be cut to a predetermined thickness for the purpose of obtaining two thin articles which have a foundation already reinforced. The advantage is that one may double the productivity and, further, there is the possibility of an article in the case of agglomerates which offers good mechanical properties and a limited weight.

The thin products which are obtained are subsequently subjected to the conventional operations of gauging, smoothing, polishing and chamfering of the surface which has not been reinforced.

What is claimed is:

1. A process for the structural reinforcement of fragile articles made of stone which is initially defective and considered reject due to flaws, fissures and inclusion of earth or agglomerates, said stone containing moisture, which comprises the following steps:
   (a.) heating the article to be treated for the purpose of eliminating completely the moisture present;
   (b.) applying on one surface of the said article an adhesive for the purpose of guaranteeing the adhesion of the resin which is subsequently applied onto said article;

(c.) strewing said surface of said article with a resin layer containing glass fibers or a metallic wire for the purpose of reinforcing said article, said resin being capable of undergoing a catalytic reaction;

(d.) strewing grit of stone having constant and defined granulometry on said surface from step c.);

(e.) compacting mechanically said grit by vibration or compression for the purpose of causing said grit to penetrate into said resin layer;

(f.) letting said resin undergo said catalytic reaction;

(g.) levelling said surface by means of mechanical operations whereby said article has increased structural resistance and the reject may be recovered.

2. The process according to claim 1 wherein said step (f) is carried out by application of heat.

3. The process according to claim 1 wherein said article has one first surface and an opposite surface, said first surface is treated according to steps (b)–(f) and said opposite surface is smoothed or polished.

4. The process according to claim 1 wherein said article is an agglomerate of marble or stone of small thickness whereby said article acquires good mechanical properties equal to a similar article of great thickness and limited weight.

5. The process according to claim 1 wherein said steps (a)–(g) are carried out on both surfaces of an articles of sufficient thickness to be handled on both surfaces and subsequently said article is cut along its thickness for the purpose of obtaining two thin articles, each of which has a reinforced surface and the other surface is suitable to be smoothed and polished for the purpose of improving the aesthetic properties suitable for flooring or as a coating.

* * * * *

UNITED STATES PATENT AND TRADEMARK OFFICE
CERTIFICATE OF CORRECTION

PATENT NO. : 4,981,539
DATED : JANUARY 1,1991
INVENTOR(S) : LUCA TONCELLI

It is certified that error appears in the above-identified patent and that said Letters Patent is hereby corrected as shown below:

```
On title page insert:

(30) FOREIGN APPLICATION PRIORITY DATA
     JANUARY 21,1988   ITALY   85509 A/88
```

Signed and Sealed this

Twelfth Day of November, 1991

*Attest:*

HARRY F. MANBECK, JR.

*Attesting Officer*  *Commissioner of Patents and Trademarks*